A. FULLER.
Faucet.
No. 167,092.
Patented Aug. 24, 1875.
Fig. 1.
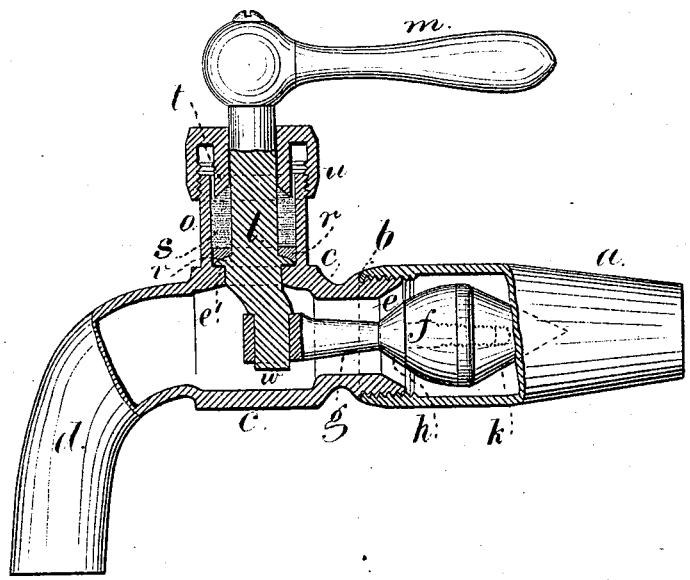
Fig. 2.
Fig. 3.
Witnesses
Chas. H. Smith
Harold Sirrell
Inventor
Albert Fuller
per Lemuel W. Serrell
atty.

UNITED STATES PATENT OFFICE.

ALBERT FULLER, OF BROOKLYN, NEW YORK.

IMPROVEMENT IN FAUCETS.

Specification forming part of Letters Patent No. 167,092, dated August 24, 1875; application filed May 31, 1875.

*To all whom it may concern:*

Be it known that I, ALBERT FULLER, of Brooklyn, in the county of Kings and State of New York, have invented an Improvement in Faucets, of which the following is a specification:

This invention is an improvement upon that for which Letters Patent No. 13,677 were granted to me and extended. In that patent a valve is shown that is opened against the pressure of liquid by means of an eccentric pin on the spindle of the faucet, and this valve-spindle was packed by a gland with a screw-cap. In practice it has been found difficult to keep this packing in proper condition in consequence of the turning movement and the lateral strain upon the spindle, and in addition, the packing material was liable to become clogged in the screw-thread.

My invention relates to an improvement in the construction of the packing-gland, whereby the gland is rendered more durable under the lateral strain and turning movement of the spindle passing through that gland.

In the drawing, Fig. 1 is a vertical section of the faucet complete. Fig. 2 is an inverted plan of the screw-cap of the packing-gland, and Fig. 3 is the lead gasket at the base of the packing.

The cock is composed of the inlet-tube $a$ screwed at $b$ to the body $c$ and the bib or delivery tube $d$. The seat $e$ for the valve $f$ is at the junction of the body $c$ and tube $a$, and this valve $f$ is elastic, preferably of rubber, and upon the stem $g$. $h$ represents the base of the valve, and $k$ the the conical clamping-nut that, extending into the inlet-tube $a$, forms a centering guide for the valve, as the rush of water past the conical nut serves to center the same and equalize the flow of the water passing the valve when the same is open. The valve-stem $g$ and the spindle $l$ are connected by an eccentric pin, $w$, that passes into an eye at the end of the stem, and this spindle passes vertically through the packing-gland and terminates as a handle, $m$. The spindle $l$ is provided with a collar, $v$, that rests upon a flat seat, $e'$, at the bottom of the gland-chamber $o$, and a gasket of lead at $r$ surrounds this spindle above the conical end and intervenes between such conical end and the elastic packing $s$ in the gland, so as to prevent the elastic material being pressed into the opening at the bottom of the gland-chamber and to prevent the spindle rising. The cap of this gland is made with a cylindrical follower, $t$, fitting the gland-chamber, and with a screw-rim, $u$, fitting upon the outside of the cylinder containing such gland, so that the elastic or fibrous packing of the gland will be compressed by the hub $t$, but will not come into contact with the screw-threads; hence the packing material will not clog the threads or be cut by them.

I am aware that a metal valve has been used upon the end of the valve-stem, and that the back of such valve has been contracted to form a screw-head. A packing-gland has also been used with a cock of this character, such gland having a screw-thread upon its interior surface contiguous to the packing. In my gland the screw-thread is upon the outside, so as not to interfere with the packing.

I claim as my invention—

1. The packing-gland, made of the rim $u$, screwing upon the outside of the cylinder containing the packing $s$, and the cylindrical follower $t$ passing into the gland-chamber, in combination with the spindle $l$ and collar $v$, substantially as set forth.

2. In combination with the spindle $l$, eccentric-pin $w$, and stem $g$, the elastic valve $f$, and conical nut, for compressing the valve and forming a guide to the valve, as set forth.

Signed by me this 26th day of May, A. D. 1875.

ALBERT FULLER.

Witnesses:
  GEO. T. PINCKNEY,
  CHAS. H. SMITH.